United States Patent
Hotta

(10) Patent No.: US 12,545,238 B2
(45) Date of Patent: Feb. 10, 2026

(54) PARK ASSIST DEVICE AND STORAGE MEDIUM

(71) Applicant: TOYOTA JIDOSHA KABUSHIKI KAISHA, Toyota (JP)

(72) Inventor: Keisuke Hotta, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 142 days.

(21) Appl. No.: 18/418,692

(22) Filed: Jan. 22, 2024

(65) Prior Publication Data
US 2024/0336255 A1     Oct. 10, 2024

(30) Foreign Application Priority Data

Apr. 7, 2023   (JP) ................................ 2023-062967

(51) Int. Cl.
*B60W 30/06*   (2006.01)

(52) U.S. Cl.
CPC ......... *B60W 30/06* (2013.01); *B60W 2556/10* (2020.02)

(58) Field of Classification Search
CPC ...... B60W 30/06; B60W 60/00; B60W 60/01; G08G 1/14
See application file for complete search history.

(56) References Cited

U.S. PATENT DOCUMENTS

| | | | |
|---|---|---|---|
| 9,522,661 B2 | 12/2016 | Inoue et al. | |
| 9,604,638 B2 | 3/2017 | Kiyokawa et al. | |
| 9,738,276 B2 | 8/2017 | Kiyokawa et al. | |
| 9,828,028 B2 | 11/2017 | Ishijima et al. | |
| 9,836,658 B2 | 12/2017 | Kiyokawa et al. | |
| 9,875,655 B2 | 1/2018 | Kiyokawa et al. | |
| 10,031,227 B2 | 7/2018 | Kiyokawa et al. | |
| 10,150,486 B2 | 12/2018 | Hoshino et al. | |
| 10,222,224 B2 * | 3/2019 | Johnson | G08G 1/205 |
| 10,239,520 B2 | 3/2019 | Tomozawa et al. | |
| 10,377,416 B2 | 8/2019 | Fukukawa et al. | |
| 11,441,908 B2 * | 9/2022 | Max | G08G 1/0116 |
| 2022/0388501 A1 * | 12/2022 | Jian | B62D 15/0285 |

FOREIGN PATENT DOCUMENTS

JP   2020-049983 A   4/2020

* cited by examiner

*Primary Examiner* — Luke Huynh
(74) *Attorney, Agent, or Firm* — SoraIP, Inc.

(57) ABSTRACT

A park assist device that assists in parking of a vehicle includes: a location storage unit configured to store location information of a parking place in a storage unit when the vehicle is parked in the parking place; and a proposal unit configured to, when determination is made based on current location information of the vehicle detected by a positioning sensor of the vehicle that the vehicle is located in a frequently used parking place out of parking places corresponding to the location information stored in the storage unit, propose an occupant of the vehicle to start automatic parking of the vehicle in the frequently used parking place, the frequently used parking place being a parking place where the vehicle has been parked at a predetermined frequency or more.

9 Claims, 5 Drawing Sheets

PARK ASSIST DEVICE AND STORAGE MEDIUM

CROSS-REFERENCE TO RELATED APPLICATION

This application claims priority to Japanese Patent Application No. 2023-062967 filed on Apr. 7, 2023, incorporated herein by reference in its entirety.

BACKGROUND

1. Technical Field

The present disclosure relates to park assist devices and storage media.

2. Description of Related Art

Conventionally, a park assist method has been proposed in which, when a driver makes an automatic parking request while a vehicle is traveling by manual driving, a search is made for a vacant parking spot in an area where the vehicle is going to be parked, and when a vacant parking spot is found, a parking route from a parking start position to the inside of the vacant parking spot is generated, and whether parking is possible is determined based on whether it is possible to generate the parking route (Japanese Unexamined Patent Application Publication No. 2020-049983 (JP 2020-049983 A)).

SUMMARY

In JP 2020-049983 A, a driver needs to make an automatic parking request in order for generation of a parking route for automatic parking to be started. However, the drive may find it troublesome if the driver needs to make an automatic parking request every time even for a parking place the driver uses frequently.

In view of the above problem, it is an object of the present disclosure to improve convenience for drivers when providing parking assistance.

The gist of the present disclosure is as follows.

(1) A park assist device configured to assist in parking of a vehicle includes: a location storage unit configured to store location information of a parking place in a storage unit when the vehicle is parked in the parking place; and
a proposal unit configured to, when determination is made based on current location information of the vehicle detected by a positioning sensor of the vehicle that the vehicle is located in a frequently used parking place out of parking places corresponding to the location information stored in the storage unit, propose an occupant of the vehicle to start automatic parking of the vehicle in the frequently used parking place, the frequently used parking place being a parking place where the vehicle has been parked at a predetermined frequency or more.

(2) The frequently used parking place may be a parking place where the vehicle has been parked a predetermined number of times or more during a predetermined period before a current time.

(3) The frequently used parking place may be a parking place where the vehicle has been automatically parked at a predetermined frequency or more out of the parking places stored in the storage unit.

(4) The location storage unit may be configured to, when the vehicle is parked in the parking place, store information on a direction in which the vehicle is parked in the parking place in the storage unit.

The proposal unit may be configured to, when proposing to start the automatic parking of the vehicle in the frequently used parking place, propose a direction in which the vehicle is to be parked in the frequently used parking place based on information on a direction in which the vehicle has been parked in the parking place.

(5) A storage medium stores a park assist program that causes a processor to store location information of a parking place in a storage unit when a vehicle is parked in the parking place, and when, based on current location information of the vehicle detected by a positioning sensor of the vehicle, the vehicle is detected to be located in a frequently used parking place out of parking places corresponding to the location information stored in the storage unit, propose an occupant of the vehicle to start automatic parking of the vehicle in the frequently used parking place, the frequently used parking place being a parking place where the vehicle has been parked at a predetermined frequency or more.

According to the present disclosure, convenience for drivers can be improved when providing parking assistance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments will be described in detail with reference to the drawings. In addition, in the following description, the same reference number is attached to the same component.

Configuration of Park Assist System

Figure 1:
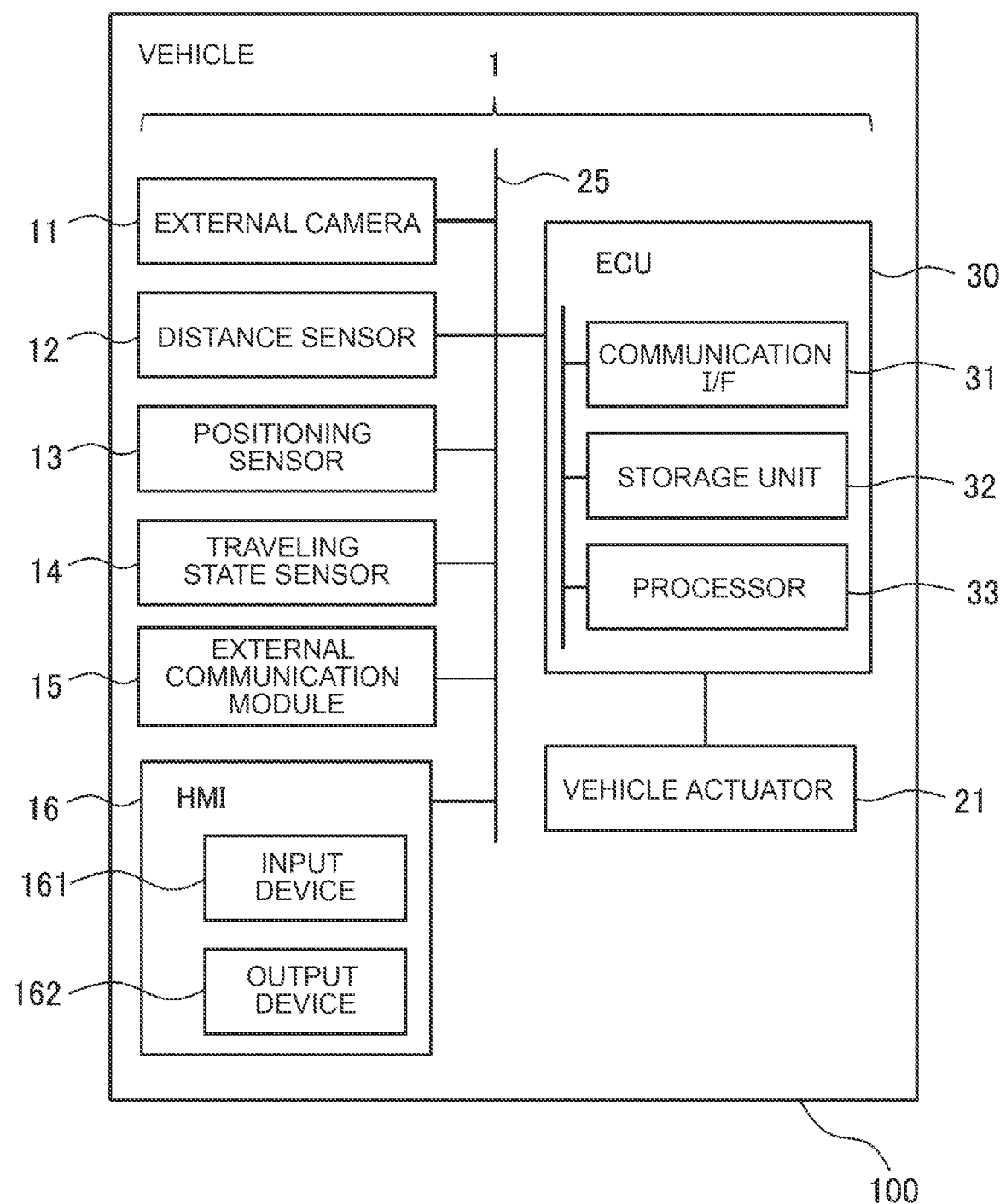
FIG. 1 is a configuration diagram schematically showing a park assist system in which a park assist device according to one embodiment is implemented.

FIG. 1 is a configuration diagram schematically showing a park assist system 1 in which a park assist device according to one embodiment is implemented. A park assist system 1 is installed in vehicle 100. The park assist system 1 automatically drives the vehicle 100 so that the vehicle 100 is automatically parked in the target parking space. In particular, the park assist system 1 of this embodiment is installed in a vehicle 100 that can be manually driven by a driver except for parking. In this embodiment, the park assist system 1 includes an external camera 11, a distance sensor 12, a positioning sensor 13, a driving state sensor 14, an external communication module 15, and a human machine interface (hereinafter referred to as "HMI") 16, a vehicle actuator 21, and an electronic control unit (hereinafter referred to as "ECU") 30.

However, the park assist system 1 does not necessarily have to have all of these. For example, the vehicle 100 does not need to have the distance sensor 12 as long as it has the external camera 11.

The external camera 11, the distance sensor 12, the positioning sensor 13, the driving state sensor 14, the external communication module 15, the HMI 16, and the ECU 30 are communicably connected via the in-vehicle network 25. The in-vehicle network 25 is a network that complies with standards such as Controller Area Network (CAN). Further, the ECU 30 is connected to the vehicle actuator 21 via a signal line.

The external camera 11 is a device that photographs the surroundings of the vehicle 100. In this embodiment, the park assist system 1 includes a plurality of external cameras 11. Of these external cameras 11, two external cameras 11 are installed, for example, inside the vehicle 100 so as to face the front and rear of the vehicle 100 and take images of the front and rear of the vehicle 100, respectively. Other two external cameras 11 are attached to the outside of the vehicle 100 (for example, on a side mirror) so as to face the left side and the right side of the vehicle 100, respectively, and take images of the left side and the right side of the vehicle 100, respectively. The external camera 11 may be a monocular camera or a stereo camera. When a stereo camera is used as the external camera 11, the external camera 11 also functions as a distance sensor 12. The external camera 11 outputs images taken at predetermined intervals to the ECU 30 via the in-vehicle network 25.

The distance sensor 12 is a sensor that measures distances to objects around the vehicle 100. In this embodiment, the distance sensor 12 can also measure the orientation of objects around the vehicle 100. The distance sensor 12 is, for example, a radar such as a millimeter wave radar, a lidar (LiDAR), or a sonar. In this embodiment, the distance sensor 12 measures distances to objects present on all sides of the vehicle. The distance sensor 12 outputs measurement results of distances to surrounding objects to the ECU 30 at predetermined intervals via the in-vehicle network 25.

The positioning sensor 13 is a sensor that measures the location of the vehicle 100. The positioning sensor 13 is, for example, a GNSS receiver. The GNSS receiver receives GNSS signals from a plurality of GNSS satellites, and measures the location of vehicle 100 based on the received GNSS signals. The positioning sensor 13 outputs self-location information of vehicle 100 to ECU 30 via the in-vehicle network 25 at predetermined intervals. Note that the positioning sensor 13 may be a receiver compliant with other satellite positioning systems as long as it can measure the location of the vehicle 100.

The driving state sensor 14 is a sensor that detects the driving state of the vehicle 100. The driving state sensor 14 detects, for example, the speed of the vehicle 100, the acceleration of the vehicle 100, the rate of change in the yaw angle (yaw rate) when the vehicle 100 turns, and the like. The driving state sensor 14 outputs the detection result of the driving state of the vehicle to the ECU 30 via the in-vehicle network 25.

The external communication module 15 communicates with equipment outside the vehicle. The external communication module 15 is a device that performs wireless communication with a wireless base station in accordance with a predetermined mobile communication standard. The external communication module 15 receives, for example, information on availability of each parking place from an external server. Note that the parking place represents a single parking area and an area near the parking area. Therefore, for example, in a home, etc., the parking place means one parking space and the area around that parking space, and, for example, in a shopping center, it means the entire parking lot.

HMI 16 is a user interface for exchanging information between vehicle ECU 30 and the occupant of vehicle 100. The HMI 16 includes an input device 161 that receives input from the occupant of the vehicle 100, and an output device 162 that notifies the occupant of the vehicle 100. The input device 161 is a device that accepts a physical operation or a voice operation by the occupant as input. The input device 161 includes, for example, one of a touch panel, a switch, a button, a microphone, and the like. On the other hand, the output device 162 is a device that notifies the occupant through the occupant's five senses (for example, visual, auditory, tactile, etc.). The output device 162 includes, for example, any one of a display device (e.g., a liquid crystal display, a head-up display, a warning light, etc.), a speaker, a vibration unit, and the like.

The HMI 16 transmits input received from the occupant via the input device 161 to the ECU 30 via the in-vehicle network 25. Furthermore, the HMI 16 notifies the occupant via the output device 162 of information corresponding to the signal received from the ECU 30 via the in-vehicle network 25.

Vehicle actuator 21 is an actuator used to control the operation of vehicle 100. Specifically, the vehicle actuator 21 includes, for example, a drive actuator that controls an internal combustion engine or an electric motor for driving the vehicle 100, a braking actuator that controls a brake that brakes the vehicle 100, and a steering actuator that controls the steering of the vehicle 100. Vehicle actuator 21 controls acceleration, braking, and steering of vehicle 100 in accordance with control signals transmitted from ECU 30 via a signal line.

The ECU 30 functions as a park assist device that assists in parking of the vehicle 100. In the present embodiment, when the vehicle 100 is located in a parking place where the vehicle 100 has been automatically parked frequently in the past, the ECU 30 proposes to the occupant of the vehicle 100 to start automatically parking. In addition, ECU 30 controls vehicle actuator 21 to automatically park the vehicle 100 in the target parking space. In the example shown in FIG. 1, the park assist system 1 is composed of one ECU 30. However, the park assist system 1 may be composed of a plurality of ECUs 30 separated by function. ECU 30 includes a communication interface 31, a storage unit 32, and a processor 33. The communication interface 31, the storage unit 32, and processor 33 may be separate circuits. Alternatively, the communication interface 31, the storage unit 32, and the processor 33 may be configured as one integrated circuit.

The communication interface 31 has a communication interface circuit and a device interface circuit. The communication interface circuit is a circuit for connecting the ECU 30 to the in-vehicle network 25. The device interface circuit is a circuit for outputting a control signal to the vehicle actuator 21. The communication interface 31 transmits signals received from the external camera 11, the distance sensor 12, the positioning sensor 13, the driving state sensor 14, the external communication module 15, and the input devices 161 of the HMI 16 to the processor 33. Further, the communication interface 31 transmits the signal output from the processor 33 to the output device 162 of the HMI 16 and the vehicle actuator 21.

The storage unit 32 stores data. The storage unit 32 includes, for example, at least one of a volatile semiconductor memory, a nonvolatile semiconductor memory, a hard disk drive (HDD), and a solid state drive (SSD). The storage unit 32 stores programs executed by the processor 33 of the ECU 30. The storage unit 32 is an example of a storage medium. Furthermore, the storage unit 32 stores data transmitted from the external camera 11 etc. In addition, the storage unit 32 stores location information of the parking place when the vehicle 100 is parked in the parking place.

The processor 33 includes one or more Central Processing Units (CPUs) and their peripheral circuits. The processor 33 may further include other arithmetic circuits such as a logical arithmetic unit or a numerical arithmetic unit. The processor 33 executes the program stored in the storage unit 32.

Figure 2:
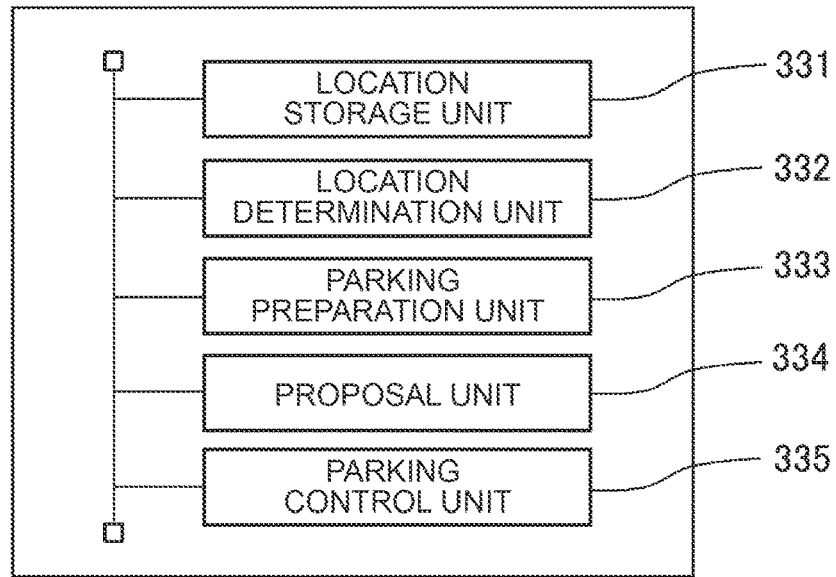
FIG. 2 is a functional block diagram of the processor of the ECU.

FIG. 2 is a functional block diagram of the processor 33 of the ECU 30. As shown in FIG. 2, the processor 33 includes a location storage unit 331, a location determination unit 332, a parking preparation unit 333, a proposal unit 334, and a parking control unit 335. The location storage unit 331 causes the storage unit 32 to store location information of the parking place when the vehicle 100 is parked. Based on the current location information of the vehicle 100 detected by the positioning sensor 13, the location determination unit 332 determines whether the vehicle 100 is located in a frequently used parking place where the vehicle has been parked at a predetermined frequency or more out of parking places stored in the storage unit 32. The parking preparation unit 333 makes preparations for parking the vehicle 100. When the location determination unit 332 determines that the vehicle 100 is located in a frequently used parking place and the parking preparation unit 333 makes preparations, the proposal unit 334 proposes to the occupant of the vehicle 100 to start automatic parking of the vehicle 100. Parking control unit 335 controls vehicle actuator 21 so that vehicle 100 is automatically parked in the target parking space. Each of these units included in the processor 33 is a functional module realized by a computer program running on the processor 33, for example. Alternatively, each part included in the processor 33 may be a dedicated arithmetic circuit provided in the processor 33.

Overview of Parking Assistance Process

Next, an overview of a parking assistance process that is performed by the park assist system 1 configured as described above will be given. In this embodiment, when the start of the automatic parking process is requested, the parking control unit 335 performs the automatic parking process. In the automatic parking process, an attempt is made to identify a target parking space in which the vehicle 100 is to be parked and to generate a parking route to the identified target parking space, and when the parking route to the target parking space is generated, and a proposal to start automatic parking will be made to the occupant of the vehicle 100. In the automatic parking process, when the proposal to start automatic parking is accepted by the occupant, the vehicle 100 is automatically parked in the target parking space.

The request to start the automatic parking process is made, for example, by the occupant pressing an automatic parking execution button, which is one of the input devices 161. Therefore, the start of automatic parking processing is requested based on the intention of the occupant. Additionally, in the present embodiment, the request to start the automatic parking process is made when the processor 33 determines that the vehicle 100 is located in the frequently used parking place. In particular, in the present embodiment, when the vehicle 100 is parked, the location information of the parking place is stored in the storage unit 32 by the parking place storage process. Furthermore, through the parking place storage process, parking places where the vehicle 100 has been parked at a predetermined frequency or more out of the location information stored in the storage unit 32 are stored as frequently used parking places. In the location determination process, it is determined from the current location information of the vehicle 100 detected by the positioning sensor 13 whether the vehicle 100 is located in a frequently used parking place. When it is determined that the vehicle 100 is located in a frequently used parking place, a request is made to start automatic parking processing. Below, a parking place storage process, a location determination process, and an automatic parking process executed in the parking support process will be explained.

Parking Place Storage Process

Figure 3:
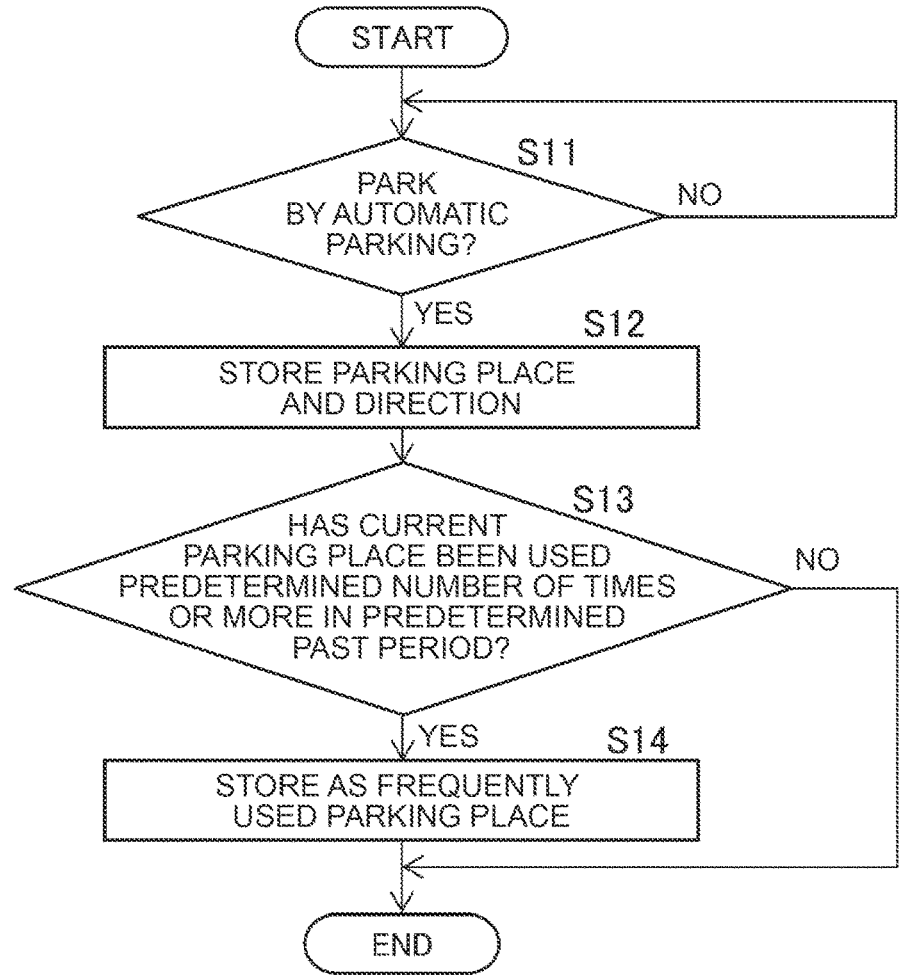
FIG. 3 is a flowchart showing the flow of parking place storage processing.

First, with reference to FIG. 3, the parking place storage process will be described. FIG. 3 is a flowchart showing the flow of the parking place storage process. The parking place storage process is executed by the processor 33 of the ECU 30.

In the parking place storage process, first, the location storage unit 331 of the processor 33 determines whether the vehicle 100 is parked by automatic parking (S11). Specifically, for example, in automatic parking processing to be described later, when the occupant operates the input device 161 to approve the start of automatic parking, the location storage unit 331 determines that automatic parking has been performed. On the other hand, when the occupant does not operate the input device 161 to approve the start of automatic parking, the location storage unit 331 determines that automatic parking is not being performed. When it is determined in S11 that the vehicle 100 is not parked by automatic parking, S11 is repeatedly executed.

When it is determined in S11 that the vehicle 100 is parked by automatic parking, the location storage unit 331 causes the storage unit 32 to store the location information of the parking place where the vehicle 100 is automatically parked and the direction of parking at the parking place (S12). Through S11 and S22, each time the vehicle 100 is automatically parked, the location information of the parking place where the vehicle 100 was automatically parked and the parking direction are stored in the storage unit 32.

Thereafter, the location storage unit 331 determines whether the currently stored parking place is a location where the vehicle 100 has been parked a predetermined number of times or more within a predetermined period of time in the past (S13). Specifically, the location storage unit 331 extracts the parking history for a predetermined period from the present to the past (for example, within the past 30 days from the present) from the storage unit 32. Then, the location storage unit 331 calculates the number of times the vehicle has been parked at the same parking place as the current parking place out of the extracted parking history. Thereafter, the location storage unit 331 determines whether the number of parking times calculated in this manner is equal to or greater than a predetermined number of times (for example, 10 times).

When it is determined in S13 that the currently stored parking place is not a location where the vehicle 100 has been parked a predetermined number of times or more within a predetermined period in the past, the location storage unit 331 ends the parking place storage process without performing any particular processing. On the other hand, when it is determined in S13 that the currently stored parking place is a location where the vehicle 100 has been parked a predetermined number of times or more within the past predetermined period, the location storage unit 331 increases the currently stored parking place. The parking place is stored as a frequently used parking place (S14). Therefore, in this embodiment, a place where the vehicle 100 has been automatically parked a predetermined number of times or more within a predetermined period is set as a frequently used parking place where the vehicle 100 has been parked at a predetermined frequency or more.

In addition, in this embodiment, the location storage unit 331 determines whether the vehicle is automatically parked in S11. However, the location storage unit 331 may determine whether the vehicle 100 is parked regardless of whether the vehicle 100 is automatically parked or manually parked. Specifically, the location storage unit 331 determines that the vehicle 100 is parked, for example, when the ignition switch is turned off. In this case, when the vehicle 100 is parked, the location storage unit 331 stores the location information of the parking place in the storage unit 32. Therefore, in this case, a place where the vehicle 100 has been parked a predetermined number of times or more within a predetermined period is set as a frequently used parking place where the vehicle has been parked a predetermined frequency or more.

Location Determination Process

Figure 4:
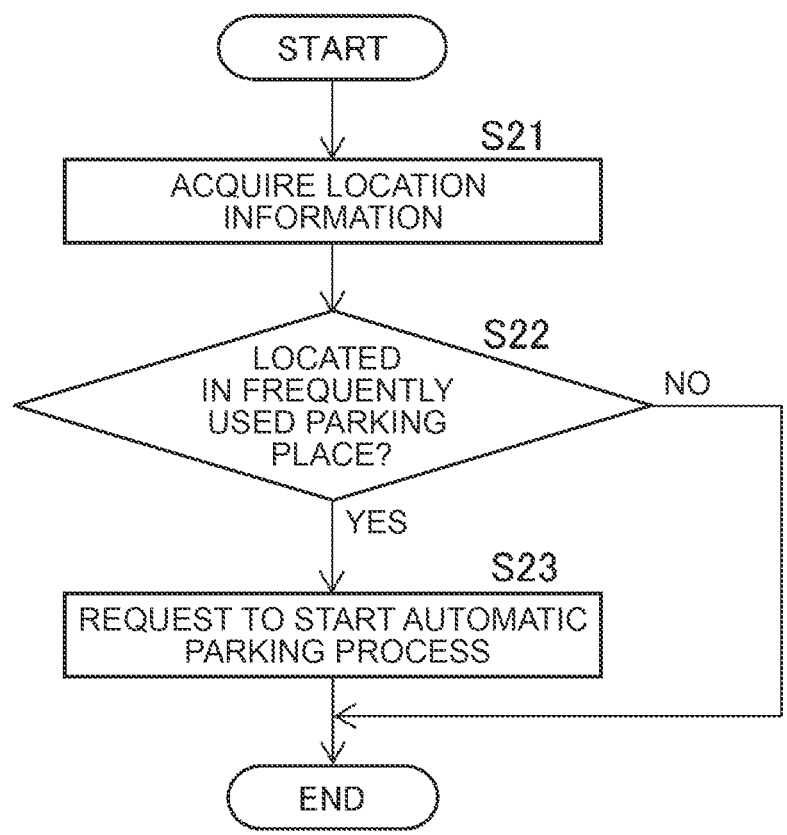
FIG. 4 is a flowchart showing the flow of a location determination process.

Next, the location determination process will be described with reference to FIG. 4. FIG. 4 is a flowchart showing the flow of the location determination process. The location determination process is executed by the processor 33 of the ECU 30 at regular time intervals.

In the location determination process, first, the location determination unit 332 of the processor 33 acquires current location information of the vehicle 100 from the positioning sensor 13 (S21). Next, the location determination unit 332 determines whether the vehicle 100 is located in a frequently used parking place, based on the current location information of the vehicle 100 acquired in S21 (S22). Specifically, the location determination unit 332 determines based on the location information of one or more frequently used parking places stored in the storage unit 32 in S14 of FIG. 3 and the current location information of the vehicle 100 whether the vehicle 100 is located in a frequently used parking place. For example, when the location of the vehicle 100 represented by the location information is present within the area represented by the location information of any frequently used parking place, the location determination unit 332 determines that the vehicle 100 is located in a frequently used parking place.

Figure 5:
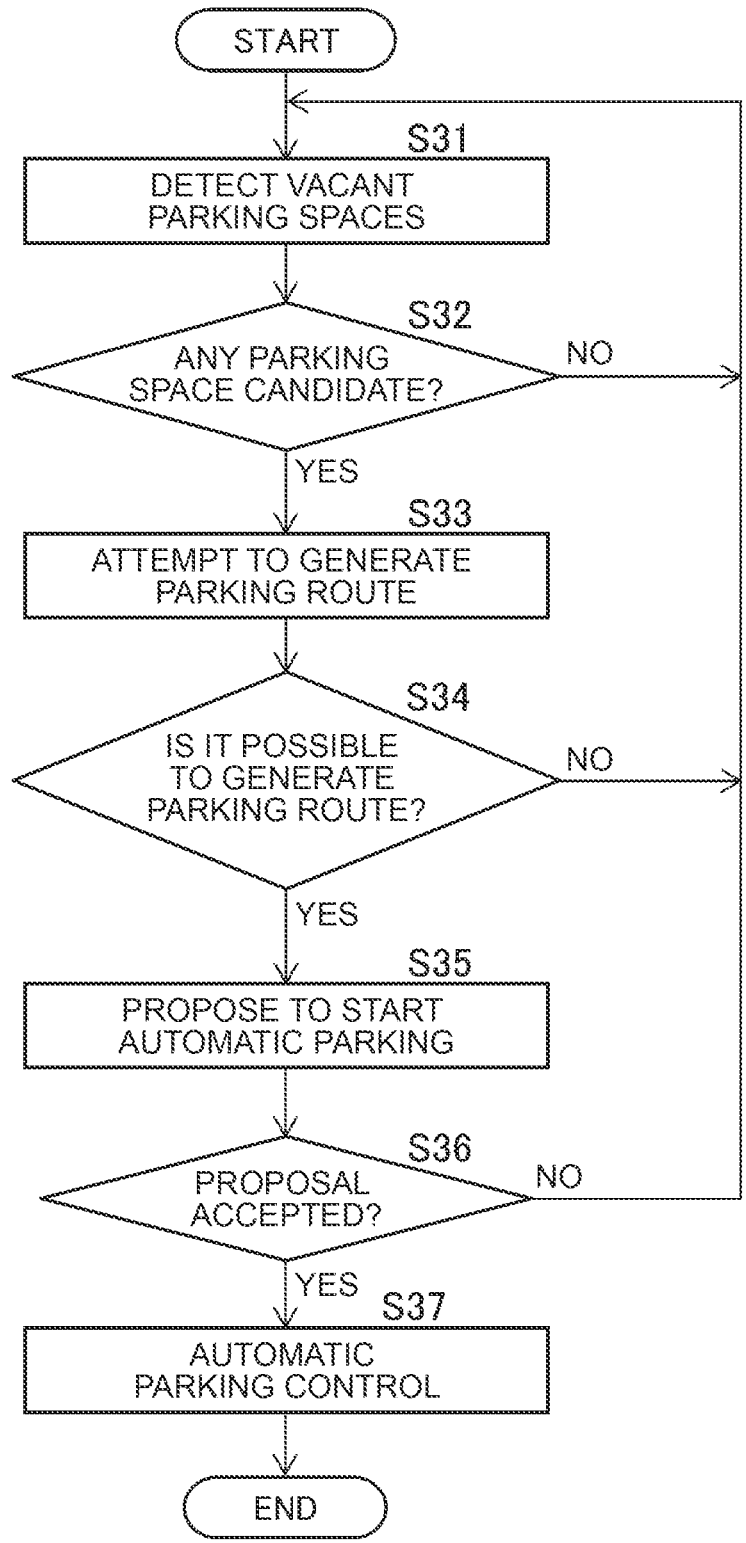
FIG. 5 is a flowchart showing the flow of automatic parking processing.

When it is determined in S22 that the vehicle 100 is located in a frequently used parking place, the location determination unit 332 requests to start an automatic parking process (S23). When the location determination unit 332 requests the start of automatic parking processing, the automatic parking processing shown in FIG. 5 is started. On the other hand, when it is determined in S22 that the vehicle 100 is not located in a frequently used parking place, the location determination process ends without the location determination unit 332 requesting to start the automatic parking process.

Automatic Parking Process

Figure 6:
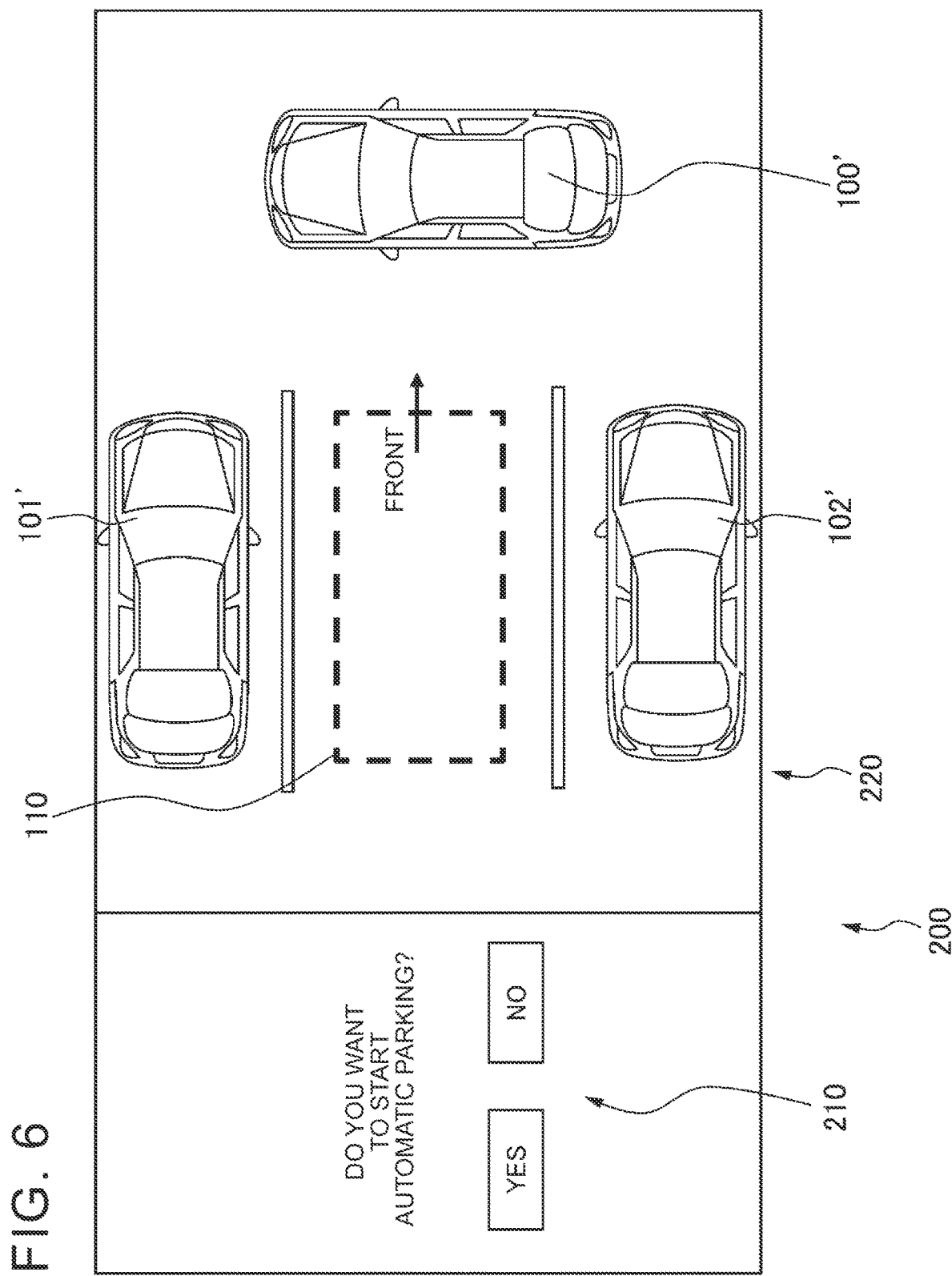
FIG. 6 is a diagram showing an example of a display screen that suggests starting automatic parking.

Next, automatic parking processing will be explained with reference to FIGS. 5 and 6. FIG. 5 is a flowchart showing the flow of automatic parking processing. The automatic parking process is executed by the processor 33 of the ECU 30. The automatic parking process shown in FIG. 5 is started when the start of the automatic parking process is requested in S23 of FIG. 4 or when the automatic parking switch, which is one of the input devices 161, is pressed by the occupant.

In the automatic parking process, first, the parking preparation unit 333 of the processor 33 detects a vacant parking space either in the frequently used parking place where the vehicle 100 is determined to be located in step 22 of FIG. 4 or around the vehicle 100 (S31). Specifically, the parking preparation unit 333 detects parking spaces around the vehicle 100 by performing image processing on an image around the vehicle 100 taken by the external camera 11. Further, for example, when the parking place of the vehicle 100 is a large parking lot that has a server that transmits information on vacant parking spaces, the parking preparation unit 333 sends information about vacant parking spaces from this server via the external communication module 15. An empty parking space at a parking place is detected by receiving parking space information.

The parking preparation unit 333 then determines whether there is a parking space candidate based on the information on the vacant parking space detected in S21 (S32). For example, when no vacant parking space is detected in S21, the parking preparation unit 333 determines that there are no parking space candidates. Furthermore, even when a vacant parking space is detected in S21 but the parking space does not satisfy the parking conditions, the parking preparation unit 333 determines that there are no parking space candidates. Specifically, for example, the size of the empty parking space is calculated from an image of the empty parking space taken by the external camera 11, and the calculated size of the empty parking space is determined based on the size of the vehicle 100. If it is too small, the parking preparation unit 333 determines that there are no parking space candidates. On the other hand, when a vacant parking space is detected in S21 and the parking space satisfies the parking conditions, the parking preparation unit 333 determines that there is a parking space candidate. When it is determined in S32 that there are no parking space candidates, S31 and S32 are repeated until a vacant parking space candidate is created, for example, because another parked vehicle leaves the parking space.

On the other hand, when it is determined in S32 that there is a parking space candidate, the parking preparation unit 333 attempts to generate a parking route until the vehicle 100 parks in the parking space candidate (S33). The parking preparation unit 333 attempts to generate a parking route based on, for example, the relative positional relationship between the vehicle 100 and the parking space candidate, any obstacle located between the vehicle 100 and the parking space candidate (e.g., other vehicles or buildings), etc. In particular, the parking preparation unit 333 attempts to generate such a parking route that the vehicle 100 is parked from the current location into the parking space candidate in a desired direction while maintaining at least a constant distance to a surrounding obstacle. When the automatic parking process is started in response to the request in S23 of FIG. 4, the desired direction is the parking direction stored in the storage unit 32 corresponding to the frequently used parking place where the vehicle 100 is determined to be located in S22 of FIG. 4. Furthermore, when it is not possible to generate a parking route that does not include cutting the steering wheel from the current location to the location of the parking space candidate, the parking preparation unit 333 attempts to generate a parking route that includes cutting the steering wheel.

Next, the parking preparation unit 333 attempts to generate a parking route in S33 and determines whether the parking route was successfully generated (S34). When it is determined in S34 that a parking route cannot be generated, the process returns to S31 and another parking space candidate is detected again.

On the other hand, when it is determined in S34 that the parking route could be generated, the proposal unit 334 of the processor 33 proposes to the occupant of the vehicle 100 to start automatic parking (S35). In this embodiment, considering that the automatic parking process is started when the vehicle 100 is determined to be located in a frequently parked place by the location determination process, it is determined that the vehicle 100 is located in a frequently used parking place and the vehicle 100 is parked. When it is determined that the route can be generated, the proposal unit 334 proposes starting automatic parking.

Furthermore, in the present embodiment, the proposal unit 334 may also propose the direction in which the vehicle 100 should be parked in a parking space candidate at the parking place. At this time, when the automatic parking process is started in response to the request in S23 of FIG. 4, the parking direction is the parking direction stored in the storage unit 32 corresponding to the frequently used parking place where the vehicle 100 is determined to be located in S22 of FIG. 4. Therefore, the proposal unit 334 proposes the parking orientation of the vehicle 100 based on information about the direction in which the vehicle 100 has been parked in the frequently used parking place.

Specifically, the proposal unit 334 displays, for example, a proposal to start automatic parking on the display device of the output device 162. FIG. 6 is a diagram showing an example of a display screen 200 that suggests starting automatic parking. In the example shown in FIG. 6, the display screen 200 includes a proposal screen 210 that proposes to the occupant to start automatic parking, and a surroundings display screen 220 that displays the surroundings of the vehicle 100 including parking space candidates. The proposal screen 210 displays YES and NO buttons for selecting whether to start automatic parking. Further, on the surroundings display screen 220, an icon 100' of the vehicle 100 and icons 101' and 102' of other vehicles (obstacles) around the vehicle 100 are displayed. Further, on the surroundings display screen 220, an icon 110 of a parking space candidate is displayed together with the direction of parking in that parking space candidate, and this allows the occupant to know where and in what direction the vehicle 100 will be parked when automatic parking is started. Note that instead of displaying on the display device, or in addition to displaying on the display device, the proposal unit 334 may propose to start automatic parking by audio using a speaker of the output device 162 etc.

Next, the proposal unit 334 determines whether the proposal to start automatic parking has been accepted by the occupant (S36). Specifically, the proposal unit 334 determines whether the occupant has pressed the YES button on the proposal screen, that is, whether the parking start switch has been pressed by the occupant. When it is determined in S36 that the proposal to start automatic parking is not accepted, for example, when it is determined that the NO button on the proposal screen has been pressed, the process returns to S31 and another parking space candidate is searched. Alternatively, when it is determined in S36 that the NO button on the proposal screen has been pressed, it may be determined that automatic parking is not necessary, and the automatic parking process may be ended.

On the other hand, when it is determined in S36 that the proposal to start automatic parking has been accepted, the parking control unit 335 executes automatic parking control (S37). That is, the parking control unit 335 automatically drives the vehicle 100 along the parking route generated in S33 until it reaches a parking space candidate based on the outputs of the external camera 11, distance sensor 12, and driving state sensor 14. Specifically, parking control unit 335 controls vehicle actuator 21 so that vehicle 100 is driven along the generated parking route. Thereby, the vehicle 100 is automatically driven until the vehicle 100 reaches the target parking space corresponding to the parking space candidate proposed in S35.

Effect

According to the above embodiment, when the vehicle 100 approaches a frequently used parking place where the vehicle 100 has been frequently parked in the past, the automatic parking process is started without input from the occupant, and the start of automatic parking is proposed. Therefore, the start of automatic parking is proposed without the occupant having to press an automatic parking switch for starting the automatic parking process near the parking space in which he or she wishes to park. Therefore, convenience for drivers is improved when providing parking assistance.

Furthermore, when the automatic parking process is started after pressing the automatic parking switch, detection of an empty parking space and an attempt to generate a parking route are performed after the automatic parking switch is pressed. Therefore, in this case, it takes time until the start of automatic parking is proposed. In contrast, in the embodiment described above, even if the automatic parking switch is not pressed, the automatic parking process is automatically started when the vehicle 100 approaches the frequently used parking place. Therefore, a proposal to start automatic parking is quickly made, thereby increasing convenience for drivers when providing parking assistance.

Although preferred embodiments according to the present disclosure have been described above, the present disclosure is not limited to these embodiments, and various modifications and changes can be made within the scope of the claims.

What is claimed is:

1. A park assist device configured to execute automatic parking of a vehicle, the park assist device comprising:
  a memory configured to store location information of a parking place in response to the vehicle being parked in the parking place; and
  one or more processors configured to
    determine whether the vehicle is in a frequently used parking place based on current location information of the vehicle detected by a positioning sensor of the vehicle, the frequently used parking place being a parking place where the vehicle has been parked at a predetermined frequency or more out of parking places corresponding to the location information stored in the memory,
    in response to determining that the vehicle is in the frequently used parking place, execute a preparation process including generating a parking route to a target space in the frequently used parking place,
    after executing the preparation process, display information on starting the automatic parking of the vehicle to the target space, and
    in a situation that the one or more processors display the information, in response to receiving an instruction to start the automatic parking of the vehicle from an occupant of the vehicle, execute the automatic parking to the target space based on the generated parking route.

2. The park assist device according to claim 1, wherein the frequently used parking place is a parking place where the vehicle has been parked a predetermined number of times or more during a predetermined period before a current time.

3. The park assist device according to claim 1, wherein the frequently used parking place is a parking place where the vehicle has been automatically parked at a predetermined frequency or more out of the parking places stored in the memory.

4. The park assist device according to claim 1, wherein:
the one or more processors are further configured to store direction information on a direction in which the vehicle is parked in the parking place in the memory; and
the information on starting the automatic parking includes the direction information indicating a direction in which the vehicle is to be parked in the frequently used parking place based on the direction information stored in the memory.

5. The park assist device according to claim 1, wherein:
the target space is an empty parking space in the frequently used parking place; and
the one or more processors are configured to determine the target space based on a size of the empty parking space and a size of the vehicle.

6. The park assist device according to claim 1, wherein the preparation process includes:
detecting an empty parking space in the frequently used parking place; and
generating the parking route that does not include cutting a steering wheel from a current location of the vehicle to the target space.

7. The park assist device according to claim 1, wherein the one or more processors are configured to display, as the information on starting the automatic parking:
buttons for selecting whether to start the automatic parking; and
surroundings of the vehicle including the target space.

8. A non-transitory storage medium storing instructions that are executable by one or more processors and that cause the one or more processors to perform functions comprising:
storing location information of a parking place in a memory in response to a vehicle being parked in the parking place;
determining whether the vehicle is in a frequently used parking place based on current location information of the vehicle detected by a positioning sensor of the vehicle, the frequently used parking place being a parking place where the vehicle has been parked at a predetermined frequency or more out of parking places corresponding to the location information stored in the memory;
in response to determining that the vehicle is in the frequently used parking place, executing a preparation process including generating a parking route to a target space in the frequently used parking place;
after executing the preparation process, displaying information on starting automatic parking of the vehicle to the target space; and
in a situation that the one or more processors display the information, in response to receiving an instruction to start the automatic parking of the vehicle from an occupant of the vehicle, executing the automatic parking to the target space based on the generated parking route.

9. A vehicle comprising:
a sensor configured to detect location of the vehicle;
an actuator configured to control an operation of the vehicle;
a display;
a memory configured to store location information of a parking place in response to the vehicle being parked in the parking place; and
one or more processors configured to execute automatic parking of the vehicle by using the sensor and the actuator, wherein the one or more processors are configured to:
communicate with the sensor, the actuator, the display, and the memory;
determine whether the vehicle is in a frequently used parking place based on current location information of the vehicle detected by the sensor, the frequently used parking place being a parking place where the vehicle has been parked at a predetermined frequency or more out of parking places corresponding to the location information stored in the memory;
in response to determining that the vehicle is in the frequently used parking place, execute a preparation process including generating a parking route to a target space in the frequently used parking place;
after executing the preparation process, display information on starting the automatic parking of the vehicle to the target space, on the display; and
in a situation that the one or more processors display the information, in response to receiving an instruction to start the automatic parking of the vehicle from an occupant of the vehicle, execute the automatic parking to the target space based on the generated parking route by using the actuator.

* * * * *